(12) United States Patent
Steinbrecher

(10) Patent No.: US 7,884,592 B2
(45) Date of Patent: Feb. 8, 2011

(54) ENERGY EFFICIENT METHOD FOR CHANGING THE VOLTAGE OF A DC SOURCE TO ANOTHER VOLTAGE IN ORDER TO SUPPLY A LOAD THAT REQUIRES A DIFFERENT VOLTAGE

(75) Inventor: Donald H. Steinbrecher, Brookline, MA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 271 days.

(21) Appl. No.: 12/322,959

(22) Filed: Jan. 26, 2009

(65) Prior Publication Data

US 2010/0188056 A1    Jul. 29, 2010

(51) Int. Cl.
G05F 5/00 (2006.01)
(52) U.S. Cl. .................. 323/301; 323/355; 323/364
(58) Field of Classification Search ........... 323/208, 323/222, 247, 301, 305, 355, 359, 364; 333/260
See application file for complete search history.

(56) References Cited

U.S. PATENT DOCUMENTS

| | | | |
|---|---|---|---|
| 3,215,925 A | 11/1965 | Rieke | |
| 3,497,794 A | 2/1970 | Fredrickson et al. | |
| 3,670,233 A | 6/1972 | Zellmer | |
| 4,350,948 A | 9/1982 | Meroni | |
| 5,365,419 A | 11/1994 | Schreiber | |
| 6,069,469 A * | 5/2000 | Morikawa | 323/208 |
| 7,504,905 B1 * | 3/2009 | Steinbrecher | 333/24 C |
| 7,620,376 B2 * | 11/2009 | Vaisanen | 455/107 |
| 7,623,002 B2 * | 11/2009 | Steinbrecher | 333/24 C |
| 2008/0122414 A1 * | 5/2008 | Solyom et al. | 323/247 |

* cited by examiner

Primary Examiner—Jessica Han
(74) Attorney, Agent, or Firm—James M. Kasischke; Michael P. Stanley; Jean-Paul A. Nasser

(57) ABSTRACT

A system and method of use for a DC-DC conversion wherein a DC supply at one voltage is converted to a DC supply at another voltage. The DC-DC converter uses a switching circuit with a broadband transmission line transformer to change the impedance level between a square-wave generator and a [square-wave]-to-DC converter. The transformer transforms generator characteristic impedance into load characteristic impedance. The method also transforms a DC source voltage into another DC load voltage.

8 Claims, 14 Drawing Sheets

ENERGY EFFICIENT METHOD FOR CHANGING THE VOLTAGE OF A DC SOURCE TO ANOTHER VOLTAGE IN ORDER TO SUPPLY A LOAD THAT REQUIRES A DIFFERENT VOLTAGE

STATEMENT OF GOVERNMENT INTEREST

The invention described herein may be manufactured and used by or for the Government of the United States of America for governmental purposes without the payment of any royalties thereon or therefor.

CROSS-REFERENCE TO RELATED APPLICATIONS

The application submitted herein is related to: U.S. patent application Ser. No. 12/022,506, filed on Jan. 30, 2008 entitled "A Method for Coupling a Direct Current Power Source Across a Dielectric Membrane or Other Non-Conducting Membrane"; U.S. patent application Ser. No. 12/022,537 filed on Jan. 30, 2008 entitled "A Method for Coupling a Direct Current Power Source Across a Nearly Frictionless High-Speed Rotation Boundary"; U.S. patent application Ser. No. 12/287,158 filed on Jan. 30, 2008 entitled "A Method for Coupling a Direct Current Power Source Across a Nearly Frictionless High-Speed Rotation Boundary" and U.S. patent application Ser. No. 12/313,789 filed on Nov. 24, 2008 entitled "Modulator for Low-Powered Wired and Wireless Command, Control and Communications Applications.

All applications are by the inventor, Dr. Donald H. Steinbrecher.

BACKGROUND OF THE INVENTION (1) Field of the Invention

The present invention relates to a method for changing the voltage of a Direct Current source to another voltage in order to supply a load that requires a different voltage.

(2) Description of the Prior Art

Sensor systems located along fixed or towed tethers need a significant amount of DC power in order to transmit sensor data. DC power for operation of the sensor systems is at a premium because of the long lengths and/or the small size of the sensor tethers.

An efficiency can be provided in some applications. For example, the $I^2R$ losses on long transmission lines can be reduced by increasing the transmission voltage and reducing the transmission current while keeping the power flow constant. If a load requires 50 Volts at 10 Amps/500 Watts, and is to be supplied over a transmission line with one Ohm line loss, then the input parameters required are 60 Volts at 10 Amps/600 Watts. The power lost in transmission is 100 Watts and the transmission line voltage drop is 10 Volts or about 20 percent.

In the prior art, power transmission is addressed:

In Ricki (U.S. Pat. No. 3,215,925), the object of the invention is to regulate the output voltage supplied to a load from a source such as a battery. A more specific object is to maintain the load voltage constant during periods of fluctuation in the magnitude of the voltage of the source or the impedance of the load. Further objects are to improve the regulation and reduce the cost of voltage supplied by a battery.

In Fredrickson (U.S. Pat. No. 3,497,794), a switching DC voltage regulator is provided which has an internally developed reference voltage source with a Zener diode connected through a resistor to the input voltage source. This includes a connection across the Zener diode to a voltage divider having a tap connection as a highly accurate reference voltage source to the base of a transistor acting as a regulating voltage comparator with an emitter connection sensing the regulated output voltage. The collector of regulating voltage comparator transistor has a controlling voltage connection to the regulator switching voltage controlling Schmitt trigger circuit.

In Zellmar (U.S. Pat. No. 3,670,233), the invention relates generally to voltage converters and in particular to voltage converters which convert a direct current voltage from a higher to a lower magnitude. In many applications in communications, especially telephony, there is a need for a supply of direct current power in which the voltage is stable over a relatively broad range of current flow. In addition, there is also a need for equipment which is relatively efficient in operation so that less heat is dissipated which would tend to raise the temperature of circuit components such as transistors and diodes and detrimentally affect their operating characteristics. Prior art techniques accomplishing this include the use of transistors in conjunction with diodes and capacitors to act as voltage dividers, or a capacitor, inductor and diodes along with a switch which alternately connects and disconnects the power source from the load. The means for controlling the switch in the prior art circuits are generally quite complicated and involve circuits which use transformers and other devices that absorb energy and circuits which are designed to create delayed pulses or oscillating currents which determine the "on" or "off" time of the switch and therefore the rise or fall of the load voltage relative to a predetermined value.

In Meroni (U.S. Pat. No. 4,350,948), a circuit is provided for reducing the voltage of a d-c power supply with one grounded terminal comprises a chopping transistor in an ungrounded supply lead, periodically turned on and off by an electronic switch, and an L/C network downstream of that transistor along with a flywheel diode. The switch lies in series with an ancillary voltage generator, having a terminal voltage substantially lower than the supply voltage, in a grounded loop which is reactively coupled to the transistor base via a capacitor or a transformer. A control signal for opening and closing the switch may be obtained from a square-wave generator connected across the transistor output and driven by the stepped-down supply voltage.

In Schreiber (U.S. Pat. No. 5,365,419) a buck type switching DC converter having coupled thereto a square-wave signal generator that modulates the pulse width of the control signal for the regulating switch depending on the output voltage of the DC converter given a fixed frequency, the square-wave signal generator being dynamically and selectively directly coupled to the control input of the regulating switch, for example, via a parallel circuit comprising a capacitor and an additional controllable switch.

As indicated in the references above, a need still exists for an efficient and alternative power transmission system design. An additional need exists for an energy efficient method for changing the voltage of a DC source to another voltage in order to a supply a load that requires a different voltage.

SUMMARY OF THE INVENTION

It is a therefore a primary object and general purpose of the present invention to provide an efficient and reliable power transmission system.

It is a further object of the present invention to provide an energy efficient method for changing the voltage of a DC source to another voltage in order to a supply a load that requires a different voltage.

To obtain the objects described, a system and method of use is disclosed that uses a switching circuit. In the circuit, a DC-DC converter method employs a broadband transmission-line transformer, with an effective turn ratio m:n (m and n are integers), to change the impedance level by a factor of $m^2/n^2$ between an energy efficient square-wave generator and an energy efficient [square-wave]-to-DC converter.

The transmission line transformer transforms a generator characteristic impedance $m^2 Z_0$ into a load characteristic impedance $n^2 Z_0$. The parameter, $Z_0$, is a characteristic impedance that could be any impedance value but may, in practice, take on values ranging from a few Ohms to a few hundred Ohms. In practice, $m^2 Z_0$ and $n^2 Z_0$ will likely lie between 5 Ohms and 500 Ohms. Thus, the transformation from a source to a load can be either up, m<n, or down, m>n. The case, m=n, is also possible from the system perspective but no transformation is effected by this choice. The special case m=n may be employed when it is necessary to change the polarity, but not the voltage of a DC source.

The transformer is located between two transmission lines with characteristic impedances $m^2 Z_0$ and $n^2 Z_0$. The output of a DC transmission line connected to a generator presents a matched termination to the transmission system represented by the Thevenin-equivalent circuit. Similarly, the DC load can represent the Thevenin-equivalent of a transmission line of any length terminating in a characteristic impedance, $n^2 Z_0$.

The method also transforms the DC source voltage $mV_{DC}/2$ into the DC load voltage $nV_{DC}/2$. The source current will be transformed from $I_{source}=V_{DC}/(2mZ_0)$ into a load current of $I_{Load}=V_{DC}/(2nZ_0)$. The power available from the source is $P_{Asource}=V_{DC}^2/4Z_0$, which is approximate to the power delivered to the DC load.

The [square-wave]-to-DC converter can present the proper terminating impedance to any transmission line with a uniform characteristic impedance. This property of the [square-wave]-to-DC converter makes possible the use of wideband transmission line transformers to change the impedance level between the source and the load without introducing standing waves. The matched condition, which permits the use of transmission lines without reflections is another inventive step. Standing waves may increase circuit losses; cause electromagnetic radiation; or cause other deleterious effects.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein like reference numerals and symbols designate identical and corresponding parts throughout the views.

DETAILED DESCRIPTION OF THE INVENTION

The description of the present invention is presented in five sections. In a first section, "Introduction to the Disclosed Method", concepts are introduced that explain circuit operation in the following sections. In a second section, "Energy Efficient Square-Wave Generator", an operation of a square-wave generator is disclosed. In a third section, "Energy Efficient [Square-wave]-to-DC Converter", a method is disclosed for converting a square-wave into Direct Current in order to supply a load. In a fourth section, "A Method for Efficiently Changing the Voltage and Current Parameters of a DC Power Supply" is disclosed.

Introduction to the Disclosed Method

Figure 1:
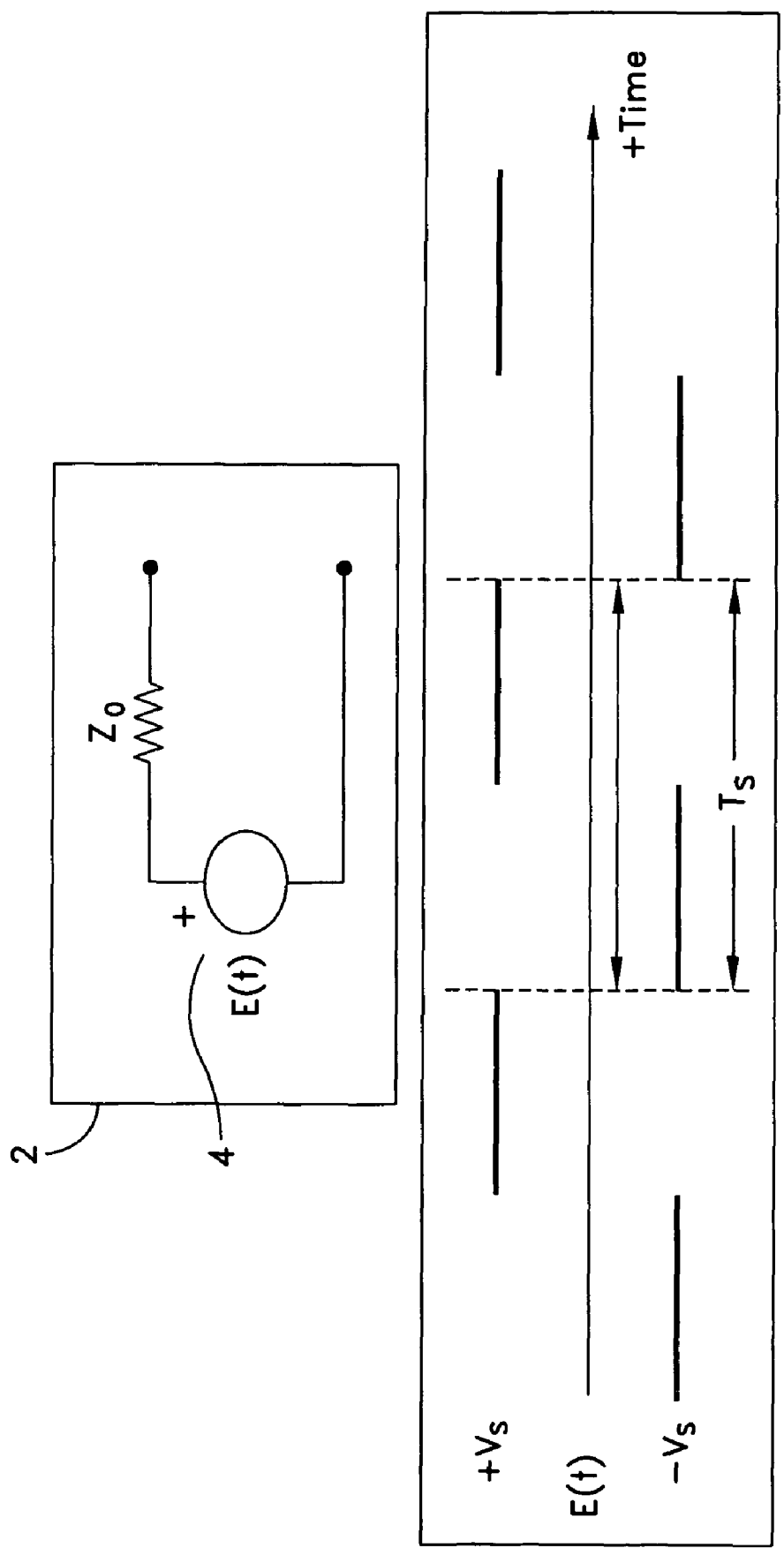
FIG. 1 depicts a Thevenin-equivalent square-wave source.

A Thevenin-equivalent square-wave source 2 is illustrated in FIG. 1. The circuit of the figure can represent the output of a transmission line of any length and having a characteristic impedance, $Z_0$. The transmission line is fed by a square-wave generator having an amplitude $V_S$ and period $T_S$. A voltage of a generator 4 switches between a positive value state (+$V_S$) and a negative value state (−$V_S$) that have the same magnitude but an opposite polarity. The switching operation is periodic with a period, $T_S$, and with equal dwell-times in each state. Thus, the average value of the voltage of the generator 4 is zero. Furthermore, the time required to switch between the two states is negligible and is assumed to be zero.

As stated, the characteristic impedance is $Z_0$, a positive real number. In general, a Thevenin-equivalent source impedance can be complex and may, under certain circumstances, have a negative real part. However, only positive real values of $Z_0$ are considered. This restriction is consistent with almost all practical applications of the disclosed method.

Figure 2:
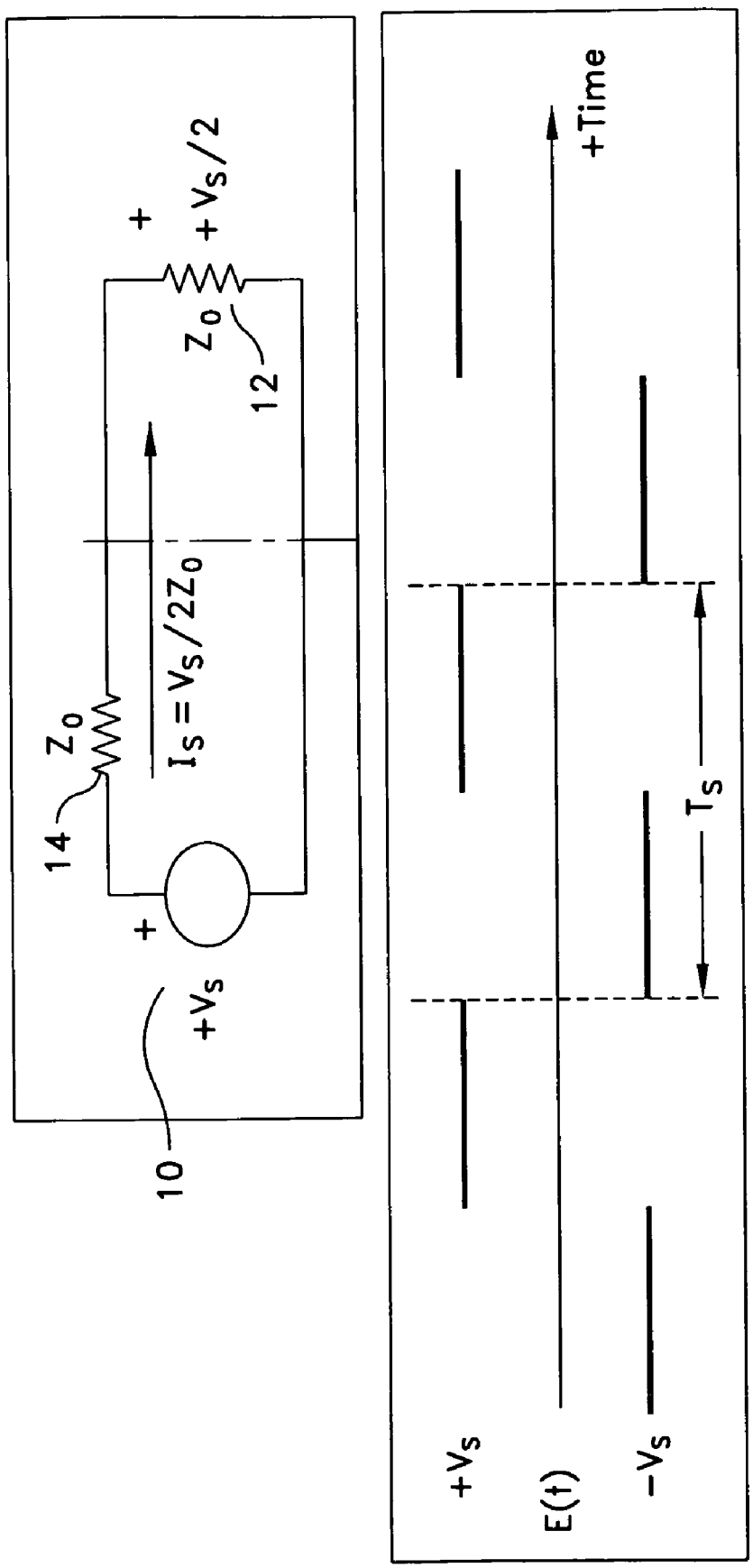
FIG. 2 depicts an optimally loaded square-wave source.

The maximum power available from the circuit of FIG. 1 is equal to the power that would be delivered to a load resistor equal to $Z_0$ as illustrated in FIG. 2. In the figure, maximum power transfer occurs when a generator 10 is driving a load that is equal to the source impedance (load 12 is $Z_0$, which is equal to a generator impedance 14). Under these conditions, the voltage across the load 12 is one half of the generator voltage +$V_s$ and the current +$I_s$ is one half of the short circuit current available from the generator 10.

Figure 3:
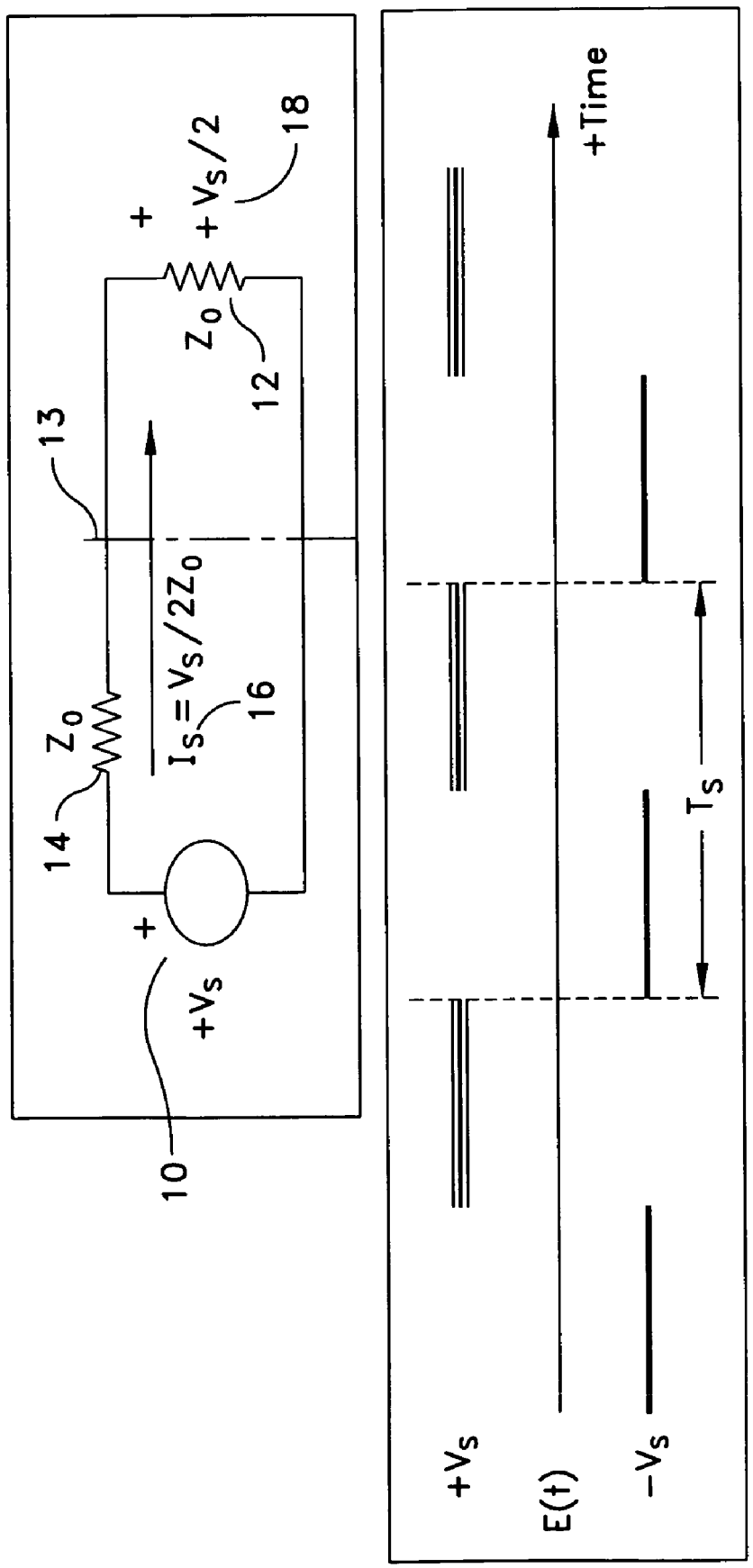
FIG. 3 depicts a square-wave source, POSITIVE half period.

During a positive state of the generator 10, illustrated in FIG. 3, a current $I_s$ (16) passing through the load, $Z_0$ (14), is $V_s/2Z_0$ so that the instantaneous power delivered to the load, $Z_0$ (12), is $(V_S)^2/4Z_0$. During the positive half period of the square-wave cycle, the current 16 is positive and equal to the peak voltage, $V_S$, divided by the total circuit resistance $2Z_0$, and a voltage 18 across the load is approximately one half of the peak voltage, +$V_S$.

Figure 4:
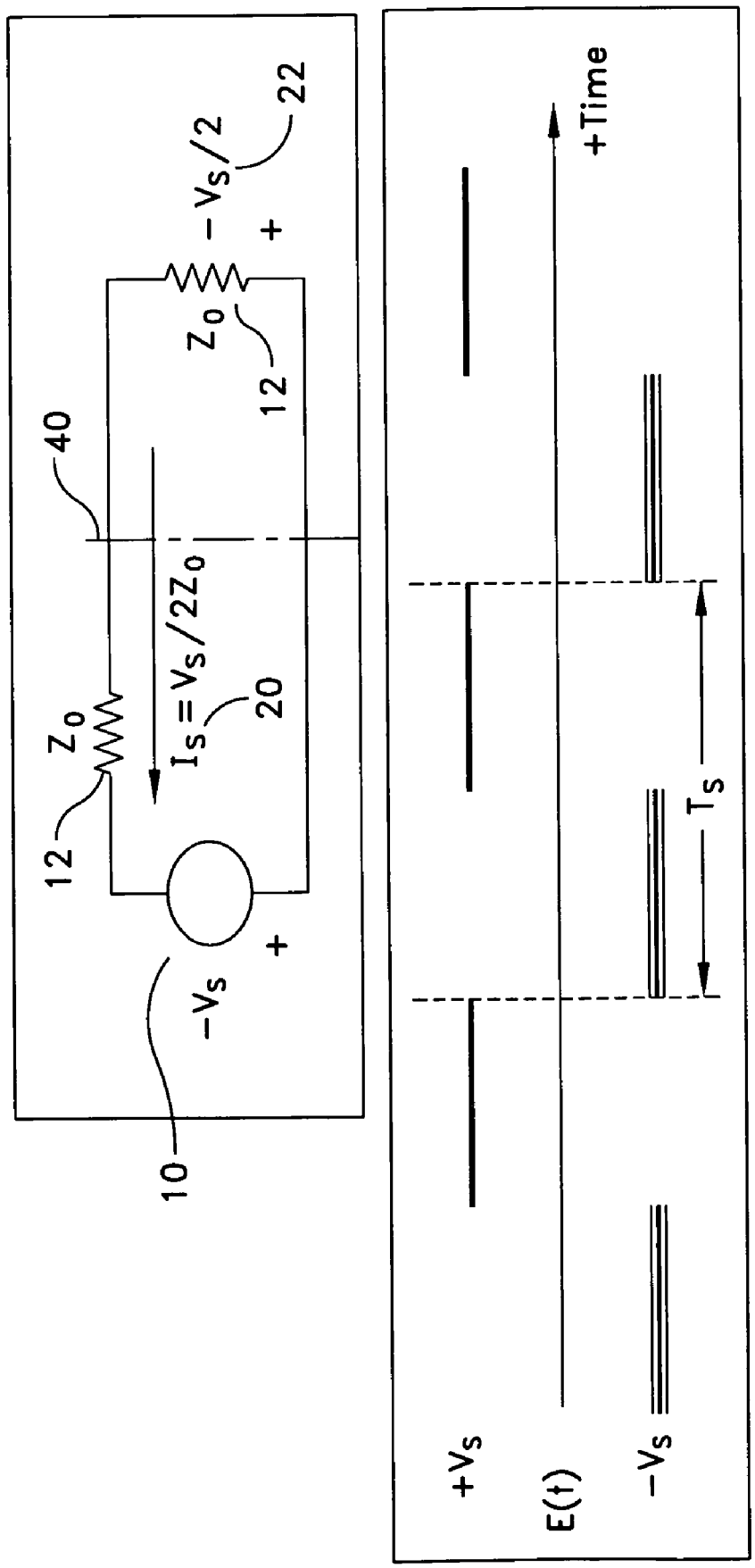
FIG. 4 depicts a square-wave source, NEGATIVE half period.

During a negative state of the generator 10, illustrated in FIG. 4, the instantaneous power delivered to the load, $Z_0$ (12), is the same, $(V_S)^2/4Z_0$, even though a current 20 flows in the opposite direction. Thus, the average power is equal to the instantaneous power and is defined as $P_{MAX}=(V_S)^2/4Z_0$, which is the maximum power available from the source. During a negative half period of the square-wave cycle, the current 20 is positive and equal to the peak voltage, −$V_S$, divided by the total circuit resistance $2Z_0$ and a voltage 22 across the load is approximately one half of the peak voltage, $-V_S$.

Energy Efficient Square-Wave Generator

Figure 5:
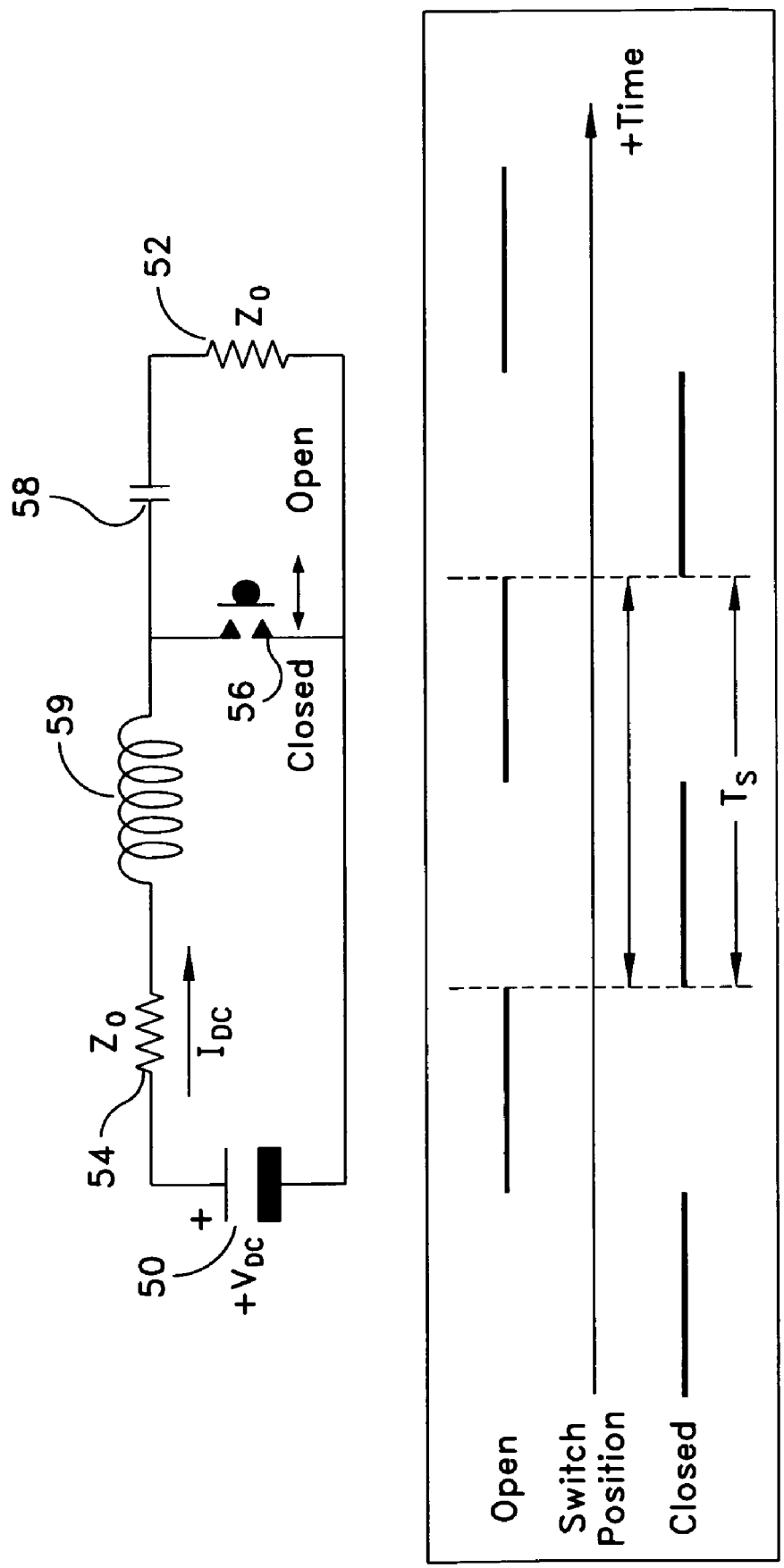
FIG. 5 depicts an energy efficient square-wave generator.

The circuit illustrated in FIG. 5 can convert a DC source 50 into a square-wave by driving an impedance, $Z_0$, of a load resistor 52 which is equal to an internal impedance $Z_0$ (54) of the DC source. Assuming ideal components, the efficiency of the conversion is approximately one hundred percent because the average square-wave power delivered to the load impedance is approximate to the maximum DC power available from the DC source 50. A square-wave is created by the periodic operation of a switch 56 that changes state once each period, $T_S$. The rate needs to be high enough so that the common mode rejection of the transmission line transformers exceeds the highest characteristic impedance. So, in practice, one would first design the transformers and then select the frequency of the generator to be compatible with that design.

The two states of the switch 56 are defined as follows: (1) when the switch is OPEN, the current through the branch containing the switch is zero while the voltage across the branch may assume any value, and (2) when the switch is CLOSED, the voltage across the branch containing the switch is zero while the current through the branch may assume any value. The dwell time in each of the two switch states is the same.

The switch 56 opens and closes periodically causing a square-wave of current to pass through the load resistor 52. A transient state occurs when the action of the switch 56 is first initialized. The transient state lasts until the voltage across a capacitor 58 and the current through an inductor 59 each reach a steady state condition.

Figure 6:
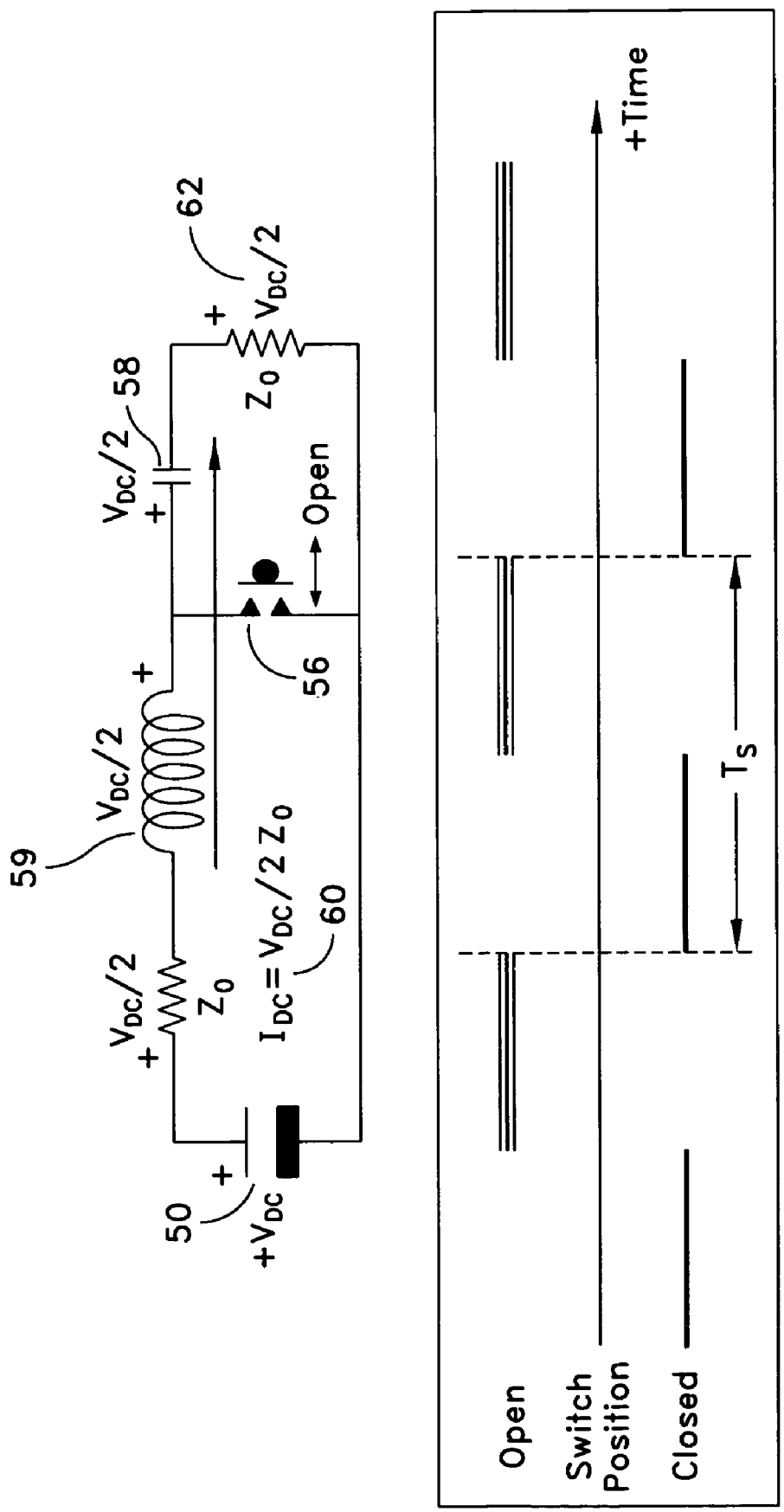
FIG. 6 depicts a square-wave generator, steady state, OPEN.

A steady state OPEN condition of the switch 56 is illustrated in FIG. 6. During this half period, $T_s/2$, energy is delivered to the circuit by the inductor 59 while the stored energy on the capacitor 58 is increasing. The average, steady state, energy stored on the inductor 59 is $E_{AVG}=[L(V_{DC})^2]/8(Z_0)^2$ in which "L" is the inductance of the inductor. The energy delivered to the circuit by the inductor 59 during each OPEN condition half period is $E_{DEL}=T_S(V_{DC})^2/8Z_0$. The choice of value of the inductor 59 is made by observing that the delivered energy, $E_{DEL}$, should be a fraction of the average energy, $E_{AVG}$. This is true if the inductance is much greater than the product $Z_0T_S$. Thus, $L \gg Z_0T_S$ is required.

During the OPEN condition of the switch 56, the voltage across the branch of the switch is $V_{DC}$.

During this half period, the switch 56 is OPEN so that the current through the branch of the switch is zero. A steady state DC current 60 equal to $V_{DC}/2Z_0$ passes through the load, $Z_0$, producing a voltage $V_{DC}/2$ (62). During this half period, energy is supplied to the circuit by the inductor 59 while energy is being stored in the capacitor 58. The voltage across the OPEN switch 56 is $V_{DC}$.

Figure 7:
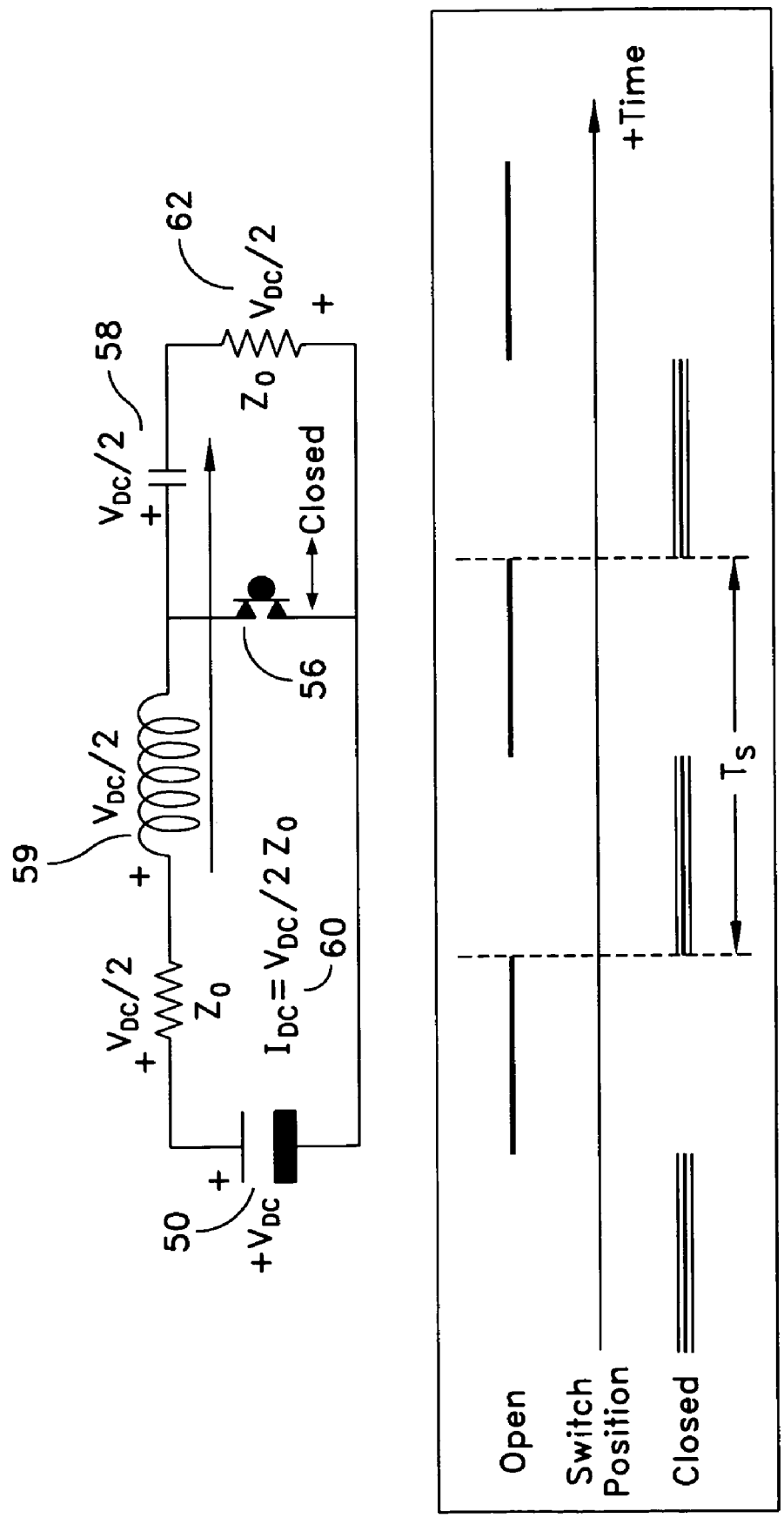
FIG. 7 depicts a square-wave generator, steady state, CLOSED.

A steady state CLOSED condition of the switch 56 is illustrated in FIG. 7. During this half period, $T_s/2$, energy is delivered to the circuit by the capacitor 58 while the stored energy of the inductor 59 is increasing. The average, steady state, energy stored on the capacitor 58 is $E_{AVG}=C(V_{DC})^2/8$ in which "C" is the capacitance of the capacitor. The energy delivered to the circuit by the capacitor 58 during each CLOSED condition half period is $E_{DEL}=T_S(V_{DC})^2/8Z_0$, which is the same as that delivered by the inductor 59 during each OPEN condition half period. The choice of the value of the capacitor 58 is made by observing that the delivered energy, $E_{DEL}$, should be a fraction of the average energy, $E_{AVG}$. This will be true if the capacitance is much greater than the ratio $T_S/Z_0$. Thus, $C \gg T_S/Z_0$ is required. During the CLOSED condition of the switch 56, the current through the branch of the switch is $V_{DC}/Z_0$, which is twice the current from the DC source 50.

During this half period, the switch 56 is CLOSED so that the voltage across the branch of the switch is zero. The steady state DC current 60 equal to $V_{DC}/2Z_0$, reverses through the load, $Z_0$, producing a voltage $V_{DC}/2$ (62). During this half period, energy is supplied to the circuit by the capacitor 58 while energy is being stored in the inductor 59. The current through the CLOSED switch 56 is $V_{DC}/Z_0$, which is twice the steady state DC current supplied by the DC source 50.

Figure 8:
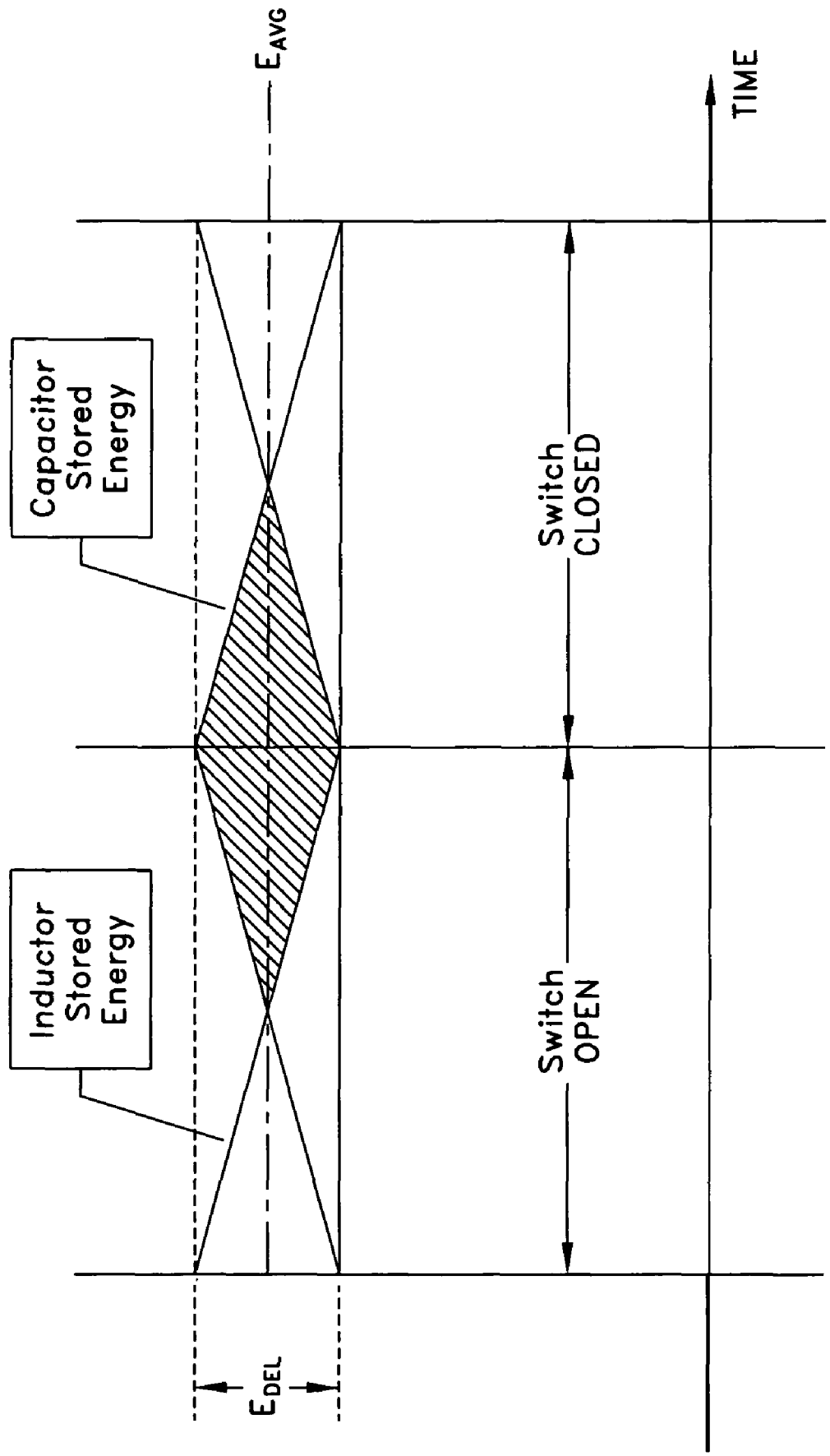
FIG. 8 depicts a square-wave generator, steady state exchange.

Energy balance is achieved if the ratio of the element values are chosen such that $(L/C)=(Z_0)^2$. The average energy stored on each element is the same. The energy exchange during each period of steady state operation is illustrated in FIG. 8. The period, $T_s$, is also constrained by the element values in that $T_s \ll (L C)^{1/2}$.

The graph of FIG. 8 depicts the time variation of the energy stored on the inductor and capacitor components in the square-wave generator illustrated in FIG. 5, FIG. 6 and FIG. 7. During each half period, energy is delivered to the circuit by either the inductor 59 or the capacitor 58 while the energy stored on the other component is increasing. During the next half period, the process reverses. The graph is based on an assumed condition that $E_{DEL} \ll E_{AVG}$. Only one period is illustrated because, in the steady state, each period is identical to every other period.

By comparing FIG. 6 with FIG. 7, the effects caused by the CLOSED operation of the switch 56 are shown. The instant that the switch 56 closes, the voltage across the inductor 59 changes polarity, but not magnitude, while the current through the capacitor 58 and the load impedance changes direction, but not magnitude. Both of these instantaneous changes are permissible by the boundary conditions imposed by the circuit components and no transient behavior occurs as a result of the CLOSED operation. The current through the inductor 59 and the voltage across the capacitor 58 do not change when the switch 56 CLOSES and this is also required by the respective boundary conditions.

The switch used to implement the square-wave generator circuit could be a transistor collector-emitter circuit. A small amount of energy would be necessary to power a switch driver to provide the base-emitter drive current, which may be more than 100 times less than the peak collector-emitter current, $V_{DC}/Z_0$, when the switch is CLOSED.

Energy Efficient [Square-wave]-to-DC Converter

Figure 9:
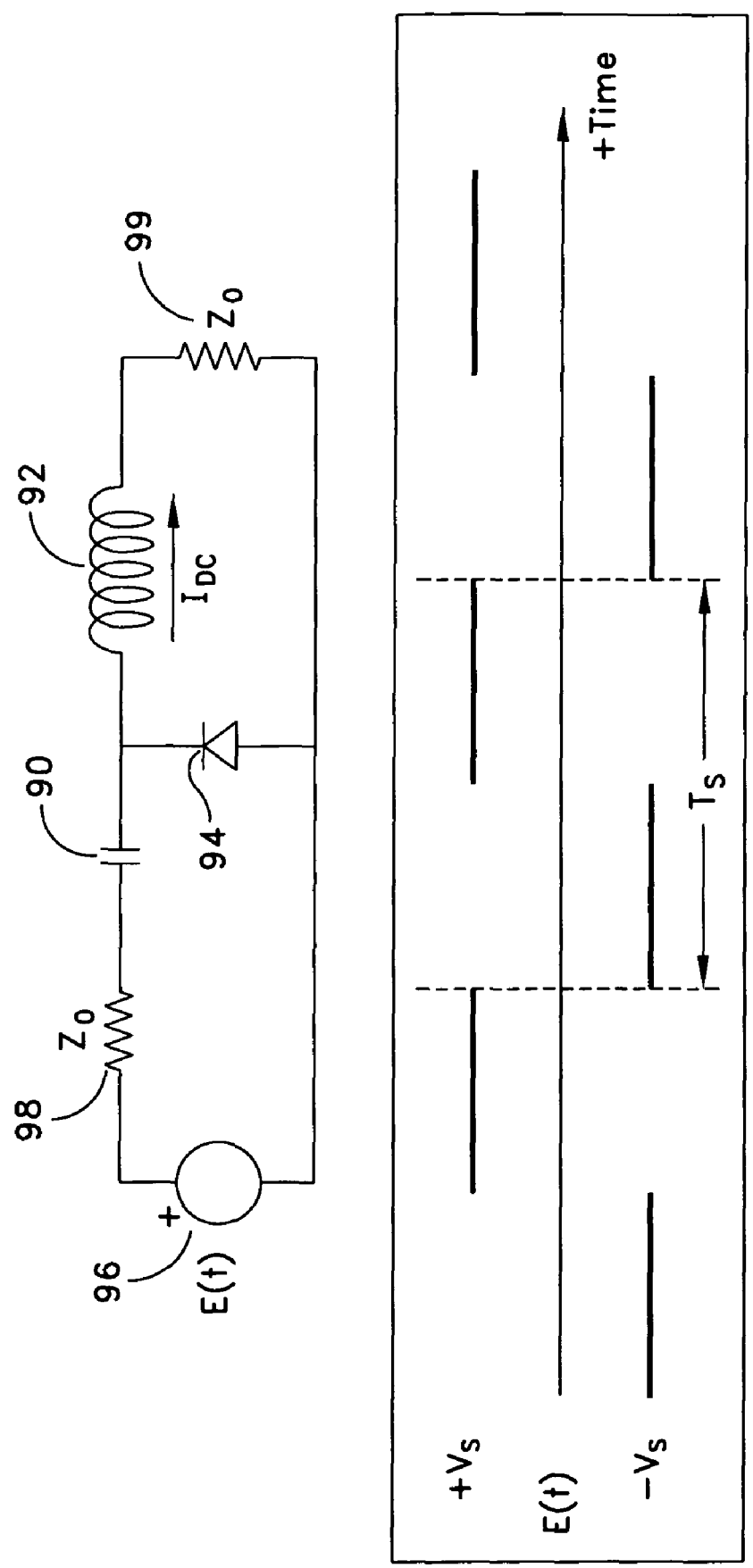
FIG. 9 depicts an energy efficient [square-wave]-to-DC converter circuit.

In FIG. 9, a [square-wave]-to-DC converter circuit is illustrated. The passive circuit includes a capacitor 90 and an inductor 92 for energy exchange and a single diode 94. A square-wave source 96 and a source impedance 98 represent a Thevenin-equivalent, as previously described in the section entitled "Introduction to the Disclosed Method", of a transmission line being driven by a square-wave generator, as previously described in the section entitled "Energy Efficient Square-Wave Generator". If the inductor 92, the capacitor 90, and a diode 94 of the converter circuit are assumed to be ideal, then the efficiency of the converter circuit is approximately one hundred percent. That is, the DC power delivered to a load $Z_0$ (99) is approximately equal to the maximum power available from the Thevenin-equivalent generator.

The square-wave source 96 switches periodically between a positive voltage, $+V_S$ and a negative voltage, $-V_S$. After a steady state condition is reached, the inductor 92 acts as a constant current source delivering a positive DC current to the load resistor. A transient occurs when the square-wave source is first initialized. The transient state lasts until the voltage across the capacitor 90 and the current through the inductor 92 each reach a steady state condition.

The square-wave is converted to Direct Current by a non-linear property of the diode 94 that, in one state, permits an undefined current to flow through the branch of the diode in only one direction while the voltage across the branch containing the diode is zero and that, in a second state, permits an undefined voltage across the branch in only one polarity while the current through the branch is zero. The operation of the converter circuit in steady state is described by observing each non-linear state separately. When the polarity of the diode 94 is as illustrated in FIG. 9, the two states correspond to the NEGATIVE half period of the square-wave and to the POSITIVE half period of the square-wave.

Figure 10:
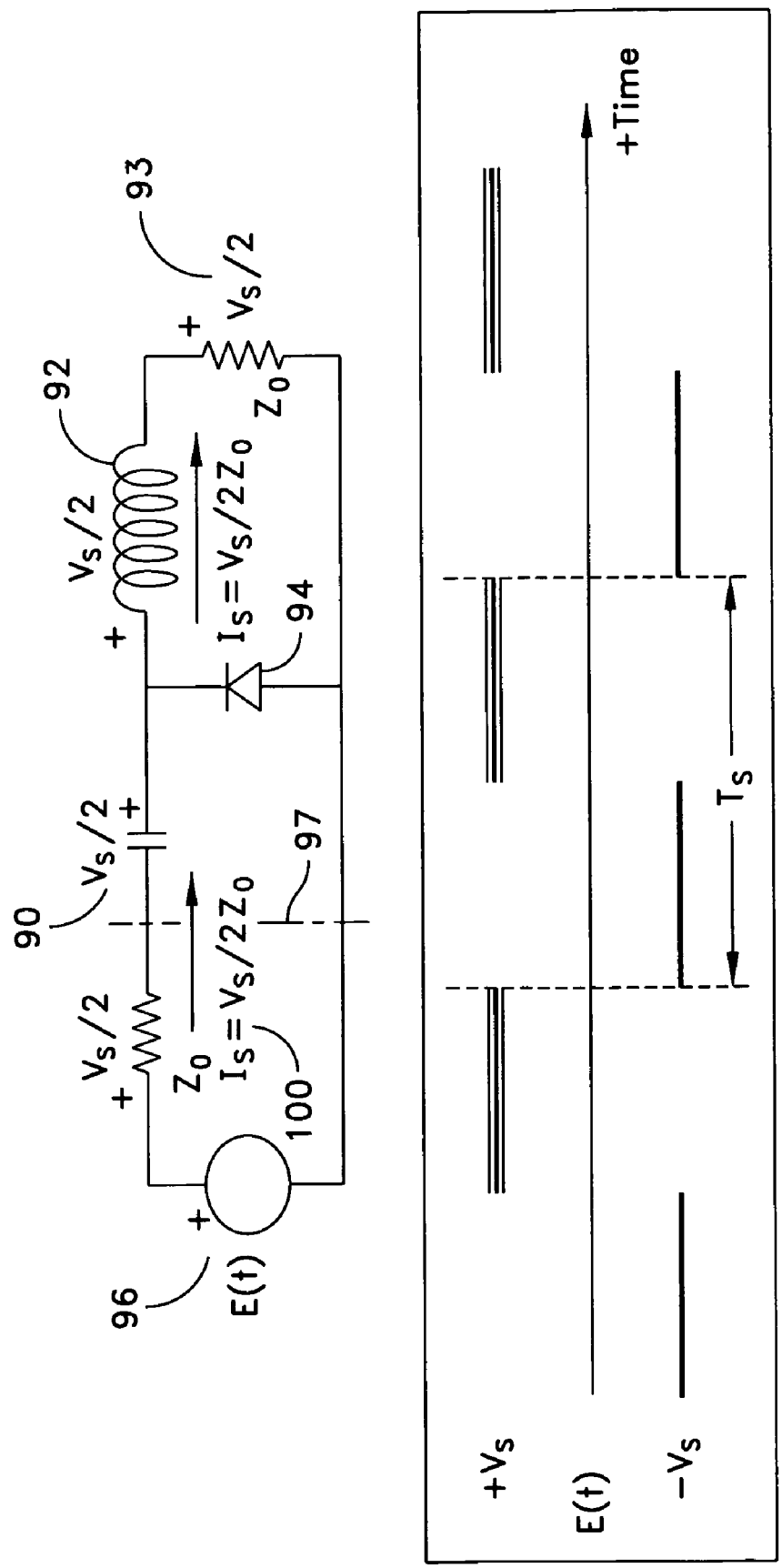
FIG. 10 depicts a [square-wave]-to-DC converter, POSITIVE, half period.

The converter circuit steady state operation during the POSITIVE half period is illustrated in FIG. 10. The current through a branch of the diode 94 is zero. Thus, a current 100 driven by the generator 96 flows through the capacitor 90, the inductor 92 and the load resistor 99. During this half period, energy is delivered to the circuit by the capacitor 90 while the stored energy of the inductor 92 is increasing. The average, steady state, energy stored on the capacitor 90 is $E_{AVG}=C(V_S)^2/8$. The energy delivered to the circuit by the capacitor during each POSITIVE half period is $E_{DEL}=T_S(V_S)^2/8Z_0$. The choice of the value of the capacitor 90 is made by observing that the delivered energy, $E_{DEL}$, should be a fraction of the average energy, $E_{AVG}$. This will be true if the capacitance is much greater than the ratio $T_S/Z_0$. Thus, $C>>T_S/Z_0$ is required. During the POSITIVE half period of the square-wave, the voltage across the branch of the diode 94 is $V_S$ with a polarity that reverse-biases the junction of the diode so that no current can flow in the branch containing the diode.

During the POSITIVE period, the square-wave source 96 presents a positive voltage, $+V_S$, to the circuit causing a current $V_S/2Z_0$ to flow in the circuit. The diode 94 is reverse-biased by a voltage equal to $V_S$ so that no current flows in the branch containing the diode. Thus, the current, $I_S$, flows through the load, $Z_0$, generating a voltage $V_S/2$ across the load. During this half period, the capacitor 90 supplies energy to the circuit while the inductor 92 is storing energy.

Figure 11:
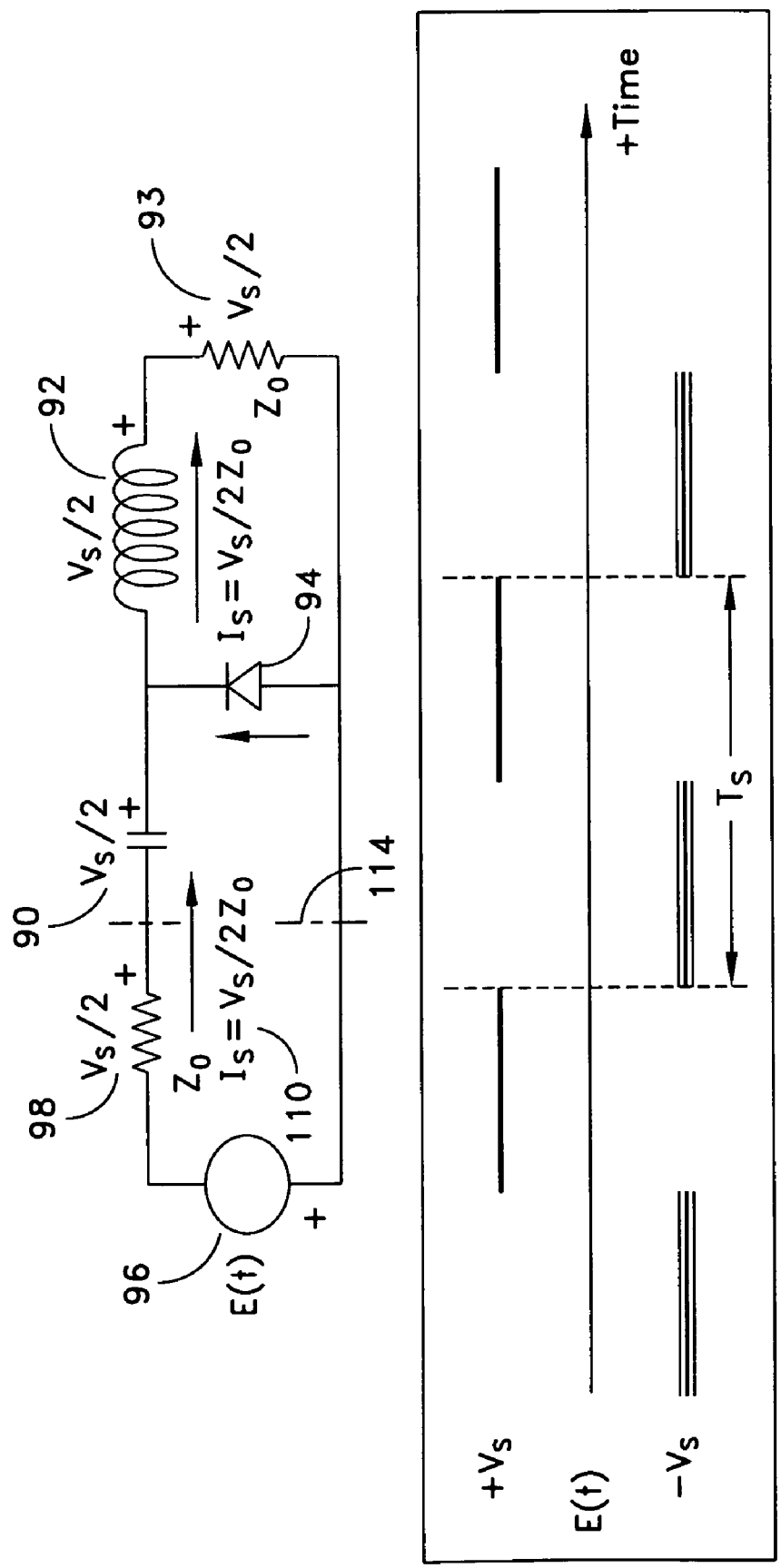
FIG. 11 depicts a [square-wave]-to-DC converter, NEGATIVE, half period.

The converter-circuit steady state operation during a NEGATIVE half period is illustrated in FIG. 11. During this half period, the square-wave source 96 presents a negative voltage, $-V_S$, to the circuit causing a current $-V_S/2Z_0$ to flow in the circuit. The diode 94 is forward-biased by a current equal to $V_S/Z_0$ and the voltage across the branch containing the diode is approximately zero. A current, $I_S$, flows through the load, $Z_0$, generating a voltage $V_S/2$ across the load. During this half period, the capacitor 90 is storing energy while the inductor 92 supplies energy to the circuit. The voltage across a branch of the diode 94 is zero and the current through the branch is $V_S/Z_0$, which is twice a current 110 driven by the generator 96. During the NEGATIVE half period, $T_S/2$, energy is delivered to the circuit by the inductor 92 while stored energy of the capacitor 90 is increasing. The average, steady state energy stored on the inductor 92 is $E_{AVG}=[L(V_S)^2]/8(Z_0)^2$. The energy delivered to the circuit by the inductor 92 during each NEGATIVE half period is $E_{DEL}=T_S(V_S)^2/8Z_0$. The choice of value of the inductor 92 is made by observing that the delivered energy, $E_{DEL}$, should be a fraction of the average energy, $E_{AVG}$. This is true if the inductance is much greater than the product $Z_0T_S$. Thus, $L>>Z_0T_S$ is required.

Energy balance is achieved if the ratio of the element values, L and C, are chosen such that $(L/C)=(Z_0)^2$. The average energy stored on each element is the same. The energy exchange during each period of steady state operation is illustrated in FIG. 12.

Figure 12:
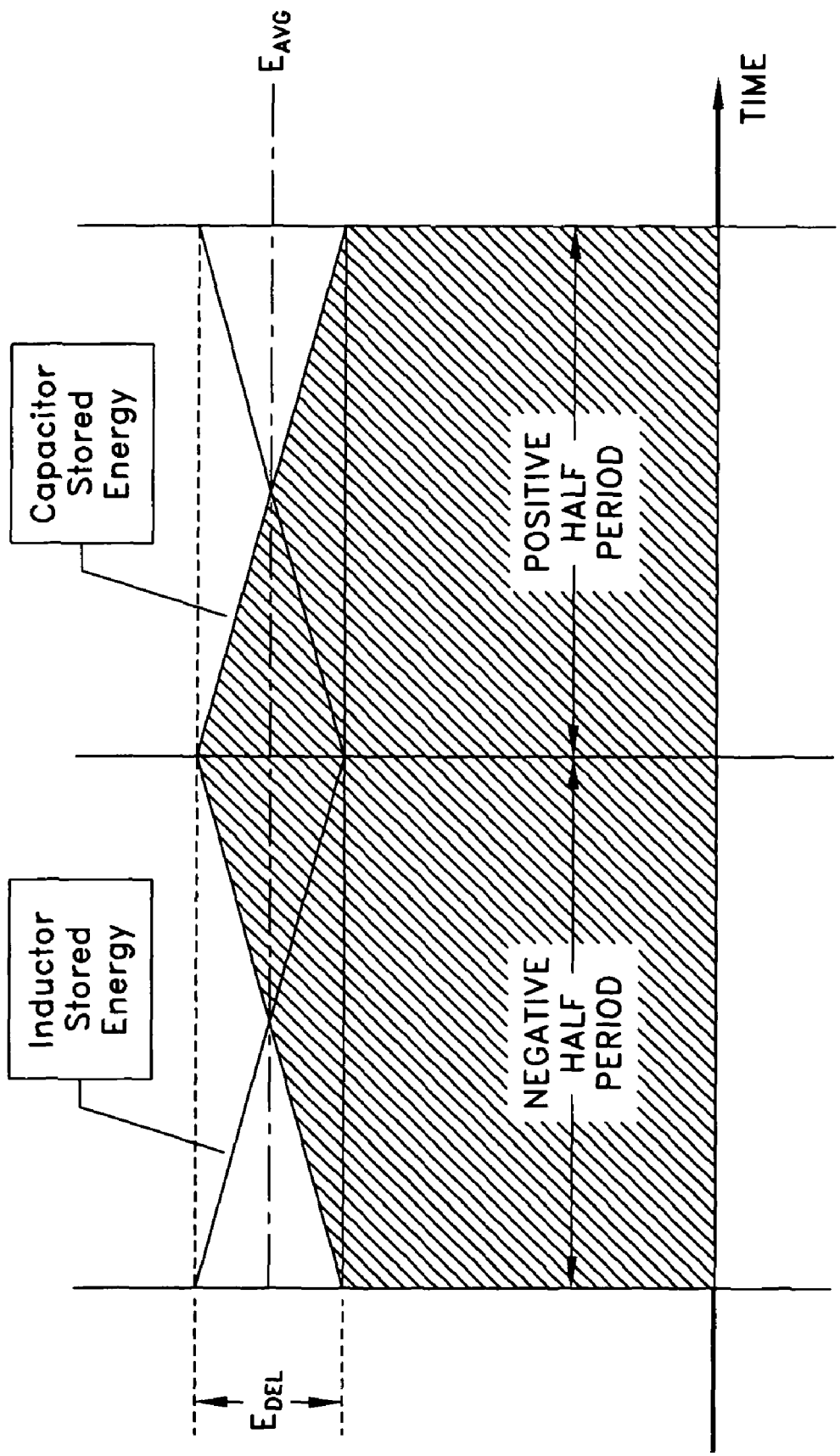
FIG. 12 depicts a DC converter, steady state energy exchange.

The graph of FIG. 12 depicts the time variation of the energy stored on the inductor 92 and capacitor 90 in the DC converter, illustrated in FIG. 9, FIG. 10 and FIG. 11. During each half period, energy is delivered to the circuit by either the inductor 92 or the capacitor 90 while the energy stored on the other component is increasing. During the next half period, the process reverses. The graph is based on an assumed condition that $E_{DEL}<<E_{AVG}$. Only one period is illustrated because, in the steady state, each period is identical to every other period.

By comparing FIG. 10 with FIG. 11, the effects caused by the instantaneous change in square-wave polarity from POSITIVE to NEGATIVE are shown. The instant that the square-wave polarity changes, the voltage across the inductor 92 also changes polarity, but not magnitude, while the current through the capacitor 90 changes direction, but not magnitude. Both of these instantaneous changes are permissible by the boundary conditions imposed by the circuit components and no transient behavior occurs as a result of the polarity change. The current through the inductor 92 and the voltage across the capacitor 90 do not change when the square-wave polarity changes as is required by their respective boundary conditions. The current through the load is the same as the current through the inductor 92 and does not change in either polarity or magnitude. Thus, a load 93 experiences direct current.

By comparing FIG. 10 with FIG. 3 and FIG. 11 with FIG. 4, the converter circuit, illustrated in FIG. 9 is indistinguishable from a resistive termination, $Z_0$. This indistinguishability from a resistor is a feature of the invention. It is this fact that allows the circuit to be moved along a transmission line without causing reflections. Consider a boundary 97 shown in FIG. 10 and a boundary 13 shown in FIG. 3.

The Thevenin-equivalent circuit to the left of the boundary 97 in FIG. 10 is identical to the Thevenin-equivalent circuit to the left of the boundary 13 in FIG. 3.

The current crossing the boundary from the Thevenin-equivalent generator to the converter circuit is identical to the current crossing the boundary from the Thevenin-equivalent generator to the matched termination, $Z_0$.

Thus, during the POSITIVE half cycle of the square-wave the converter circuit is indistinguishable from a resistor having a value $Z_0$.

Consider a boundary 114 shown in FIG. 11 and a boundary 40 shown in FIG. 4.

The Thevenin-equivalent circuit to the left of the boundary 114 in FIG. 11 is identical to the Thevenin-equivalent circuit to the left of the boundary 40 in FIG. 4.

The current crossing the boundary from the converter circuit to the Thevenin-equivalent generator is identical to the current crossing the boundary from the matched termination, $Z_0$, to the Thevenin-equivalent generator.

Thus, during the NEGATIVE half cycle of the square-wave, the converter circuit is indistinguishable from a resistor having a value $Z_0$.

After reaching a steady state condition, the disclosed converter circuit is indistinguishable from a resistive termination, $Z_0$, when driven by a square-wave. This property allows the converter circuit to be used as a matched termination for a uniform transmission line of any length with a transmission line characteristic impedance equal to $Z_0$ when the uniform transmission line is driven by a square-wave source. This property is illustrated in FIG. 13.

Figure 13:
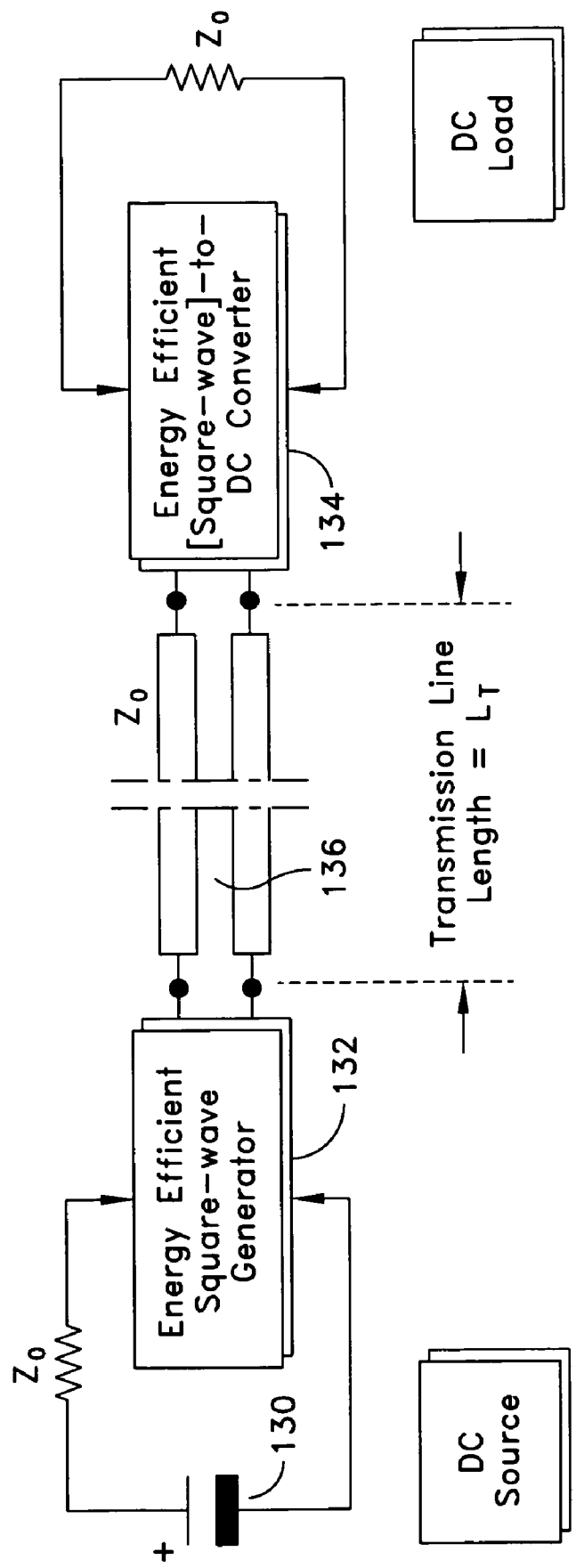
FIG. 13 depicts an efficient power-transmission model.

In FIG. 13, power from a DC source 130 is transmitted over a distance $L_T$ using an energy efficient square-wave generator 132 and an energy efficient [square-wave]-to-DC converter 134. The source impedance of the generator 132, the characteristic impedance of a transmission line 136 and the DC load impedance are each equal to $Z_0$.

The transmission line 136 may be long since the converter 134 presents a matched termination to the transmission line. The matched termination insures that there are no reflections or standing waves on the line that would corrupt the operation of the system.

Figure 14:
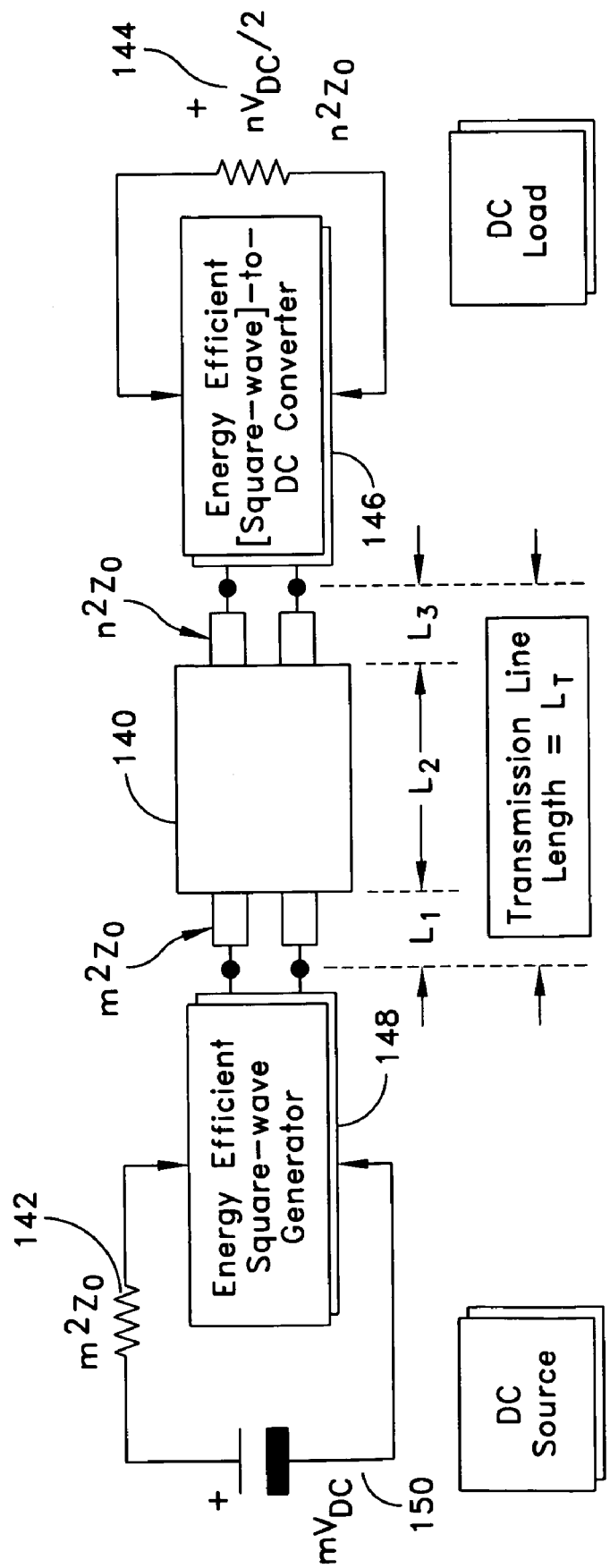
FIG. 14 depicts an efficient DC-DC converter model.

A Method for Efficiently Changing the Voltage and Current Parameters of a DC Power Supply In FIG. 14, a generalized DC-DC converter method is illustrated that employs a broadband transmission line transformer, with an effective turns ratio $m^2:n^2$ (m and n are integers), to change the impedance level between an energy efficient square-wave generator, as described in the section entitled "Energy Efficient Square-Wave Generator", and an energy efficient [square-wave]-to-DC converter, as also previously described in the section entitled "Energy Efficient [Square-Wave]-to-DC Converter".

The identified sections indicate that the [square-wave]-to-DC converter could be designed to present the proper terminating impedance to any transmission line with a uniform characteristic impedance. The input impedance is equal to the load impedance. Thus, by changing the load impedance, the input impedance is changed. The load impedance is the independent variable in the design.

This property of the [square-wave]-to-DC converter makes possible the use of wideband transmission line transformers to change the impedance level between the source and the load without introducing standing waves, which may increase circuit losses, cause electromagnetic radiation, or cause other deleterious effects.

In FIG. 14, a transmission line transformer 140 transforms a generator characteristic impedance $m^2Z_0$ (142) into a load characteristic impedance $n^2Z_0$ (144). In these relationships, "m" and "n" are integers that are determined by the configuration of the transmission line transformer. The reason for using a transformer is to match a given load impedance to a given source impedance. The process requires finding values of m and n such that the defined ratio is close to the ratio of load impedance to source impedance. Once integer values of m and n have been determined, the configuration of the transmission line transformer is derivable by methods known to those ordinarily skilled in the art.

The parameter, $Z_0$, is a characteristic impedance that could be any impedance value but may, in practice, take on values ranging from a few Ohms to a few hundred Ohms. In practice, $m^2Z_0$ and $n^2Z_0$ will likely lie between 5 Ohms and 500 Ohms. Thus, the transformation from a source to a load can be either up, m<n, or down, m>n. Transmission line transformers only work properly when the ports are properly matched. Thus, the fact that the square-wave to DC converter provides a proper termination means that the input of the transformer will properly terminate the square-wave generator. Summarized, the architecture is self-consistent.

The case, m=n, is also possible from the system perspective but no transformation is effected by this choice. However, the case m=n may be used to change the polarity if a DC source without changing the magnitude of the voltage.

The transmission line transformer 140 is located between two transmission lines $L_1$ and $L_3$ and characteristic impedance $m^2Z_0$ and $n^2Z_0$. The transmission line transformer 140 has an effective length of $L_2$. The electrical length between the generator and the load is $L_T$, which is the sum of the three segments ($L_1$, $L_2$ and $L_3$). In principal, the transmission line transformer 140 can be located anywhere between a converter 146 and a generator 148.

From the system of the figure, a method is derived in which the voltage and current on the transmission lines define square-waves that propagate from a source to a load. For minimizing radiation, the Thevenin-equivalent source comprising a DC source 150 and the DC source impedance 142 could represent the output of a DC transmission line of any length connected to the generator 148 that presents a matched termination to the transmission system represented by the Thevenin-equivalent circuit. Similarly, the DC load can represent the Thevenin-equivalent of a transmission line of any length terminating in a characteristic impedance, $n^2Z_0$.

The method of the embodiment transforms the DC source voltage $mV_{DC}/2$ into the DC load voltage $nV_{DC}/2$. Power from the DC source 150 is transmitted over the distance, $L_T$, using the energy-efficient square-wave generator 148 and the energy-efficient [square-wave]-to-DC converter 146. The transmission system includes the broadband transmission-line transformer 140 with an effective impedance ratio $n^2:m^2$. The source voltage, $mV_{DC}$, is converted to a load voltage, $nV_{DC}$. The source current will be transformed from $I_{Source}=V_{DC}/(2mZ_0)$ into a load current of $I_{Load}=V_{DC}/2(2nZ_0)$. The power available from the source is $P_{Asource}=V_{DC}^2/4Z_0$, which is approximately the power delivered to the DC load. If the disclosed method were used at the load end of the transmission line to change 100 Volts at 5 Amps to 50 Volts at 10 Amps, then the required transmission line input parameters would be 105 Volts at 5 Amps, or 525 Watts. The power lost in transmission would be 25 Watts, and the voltage drop would be 5 Volts, or about 5 percent. The power conserved would be 75 Watts. Because the transmission line losses are proportional to the square of the current while the power is proportional to the current, doubling the transmission line voltage reduces the transmission power losses by a factor of four while the power transmitted remains unchanged.

It will be understood that many additional changes in details, materials, steps and arrangement of parts which have been described herein and illustrated in order to explain the nature of the invention, may be made by those skilled in the art within the principle and scope of the invention as expressed in the appended claims.

What is claimed is:

1. A method for changing a voltage of a DC source to another voltage required for a load, said method comprising the steps of:

providing a first transmission line with a square-wave generator from the DC source with the first transmission line having a first impedance;

providing a second transmission line with a [square-wave]-to-DC converter connected to the load with the second transmission line having a second impedance;

providing a transmission line transformer positioned between the generator and the converter wherein the transformer has an effective turns ratio m:n in which m and n are integers;

generating a square-wave voltage with the generator;

transforming a level with the transformer between the first impedance of the generator and the second impedance of the converter;

transforming a current of the square-wave generator into a current of the load; and transforming the voltage of the DC source into another voltage.

2. The method in accordance with claim 1, said method further comprising the step of transforming the voltage of the DC source $mV_{DC}/2$ into a voltage $nV_{DC}/2$ of the DC load.

3. The method in accordance with claim 2, said method further comprising the step of transforming the current of the DC source from $I_{Source}=V_{DC}/(2mZ_0)$ into the load current of $I_{Load}=V_{DC}/(2nZ_0)$ of the load wherein power available from the DC source.

4. The method in accordance with claim 1, wherein the polarity of the load DC voltage with respect to a common ground is opposite the polarity of the generator voltage with respect to the same ground.

5. The method in accordance with claim 4, wherein the load voltage has the same magnitude as the generator voltage.

6. A system for changing a voltage of a DC source to another voltage required for a load, said system comprising:
- a first transmission line, said first transmission line electrically connected to the DC source;
- a square-wave generator with a first impedance electrically connected and within said first transmission line;
- a second transmission line, said second transmission line electrically connected to the load;
- a [square-wave]-to-DC converter with a second impedance electrically connected and within said second transmission line; and
- a transmission line transformer positioned between said square wave generator and said [square-wave]-to-DC converter wherein said transmission line transformer has an effective turns ratio m:n in which m and n are integers;
- wherein said generator is capable of generating a square-wave;
- wherein said transformer is capable of transforming a current of said square-wave generator into a current of the load; and transforming the voltage of the DC source into another voltage required for the load.

7. The system in accordance with claim 6, wherein said transformer is capable of transforming the voltage of the DC source $mV_{DC}/2$ into a voltage $nV_{DC}/2$ of the DC load.

8. The system in accordance with claim 6, wherein said transformer is capable of transforming the current of the DC source from $I_{Source}=V_{DC}/(2mZ_0)$ into the load current of $I_{Load}=V_{DC}/(2nZ_0)$ of the load wherein power available from the DC source.

* * * * *